United States Patent
Park et al.

(10) Patent No.: US 9,516,636 B2
(45) Date of Patent: Dec. 6, 2016

(54) METHOD AND APPARATUS FOR TRANSCEIVING A DOWNLINK CONTROL CHANNEL IN A WIRELESS COMMUNICATION SYSTEM

(71) Applicant: LG ELECTRONICS INC., Seoul (KR)

(72) Inventors: Sungho Park, Anyang-si (KR); Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/355,789

(22) PCT Filed: Dec. 7, 2012

(86) PCT No.: PCT/KR2012/010619
§ 371 (c)(1),
(2) Date: May 1, 2014

(87) PCT Pub. No.: WO2013/085336
PCT Pub. Date: Jun. 13, 2013

(65) Prior Publication Data
US 2014/0286288 A1 Sep. 25, 2014

Related U.S. Application Data

(60) Provisional application No. 61/568,109, filed on Dec. 7, 2011.

(51) Int. Cl.
*H04W 72/04* (2009.01)
*H04W 72/14* (2009.01)
*H04L 5/00* (2006.01)

(52) U.S. Cl.
CPC .......... *H04W 72/042* (2013.01); *H04L 5/0044* (2013.01); *H04L 5/0053* (2013.01); *H04W 72/0446* (2013.01); *H04W 72/14* (2013.01)

(58) Field of Classification Search
None
See application file for complete search history.

(56) References Cited

U.S. PATENT DOCUMENTS

2011/0249633 A1* 10/2011 Hong ............... H04L 5/0053
370/329
2013/0039284 A1* 2/2013 Marinier et al. ............ 370/329
(Continued)

FOREIGN PATENT DOCUMENTS

| KR | 10-2011-0112750 A | 10/2011 |
|---|---|---|
| WO | 2011-037439 A2 | 3/2011 |
| WO | 2011-137383 A1 | 11/2011 |

OTHER PUBLICATIONS

LG-Ericsson, "Consideration on E-PDCCH multiplexing and signaling," 3GPP TSG RAN WG1 #66bis, R1-113372, Oct. 14, 2011 See section 2.1 and figure 1.
(Continued)

*Primary Examiner* — Ashley Shivers
(74) *Attorney, Agent, or Firm* — Dentons US LLP

(57) ABSTRACT

The present invention relates to a wireless communication system, and more particularly, to a method and apparatus for transceiving a downlink control channel. According to one embodiment of the present invention, a method in which a base station transmits a downlink control channel to a terminal in a wireless communication system comprises the steps of: transmitting one or more enhanced-physical downlink control channels (E-PDCCHs) within a resource region allocable for an E-PDCCH; and transmitting E-PDCCH allocation resource information for the one or more E-PDCCHs to the terminal. The E-PDCCH allocation resource information indicates the resource in which the one or more E-PDCCHs exist from among the resource region allocable to the E-PDCCH. An effective physical downlink shared channel (PDSCH) allocation resource region for the terminal can be determined on the basis of the E-PDCCH allocation resource information.

16 Claims, 14 Drawing Sheets

(56) References Cited

U.S. PATENT DOCUMENTS

| | | | |
|---|---|---|---|
| 2013/0039291 A1* | 2/2013 | Blankenship | H04L 5/001 370/329 |
| 2013/0044664 A1* | 2/2013 | Nory et al. | 370/311 |
| 2013/0107861 A1* | 5/2013 | Cheng | H04W 72/042 370/331 |
| 2013/0114525 A1* | 5/2013 | Ahmadi | H04L 5/0053 370/329 |

OTHER PUBLICATIONS

Samsung, "Resource multiplexing of E-PDCCH," 3GPP TSG RAN WG1 #67, R1-114241, Nov. 18, 2011 see section 2.

New Postcom, "The VU-ePDCCH design framework," 3GPP TSG RAN WG1 Meeting #67, R1-113691, Nov. 18, 2011 see sections 2-4.

Research in Motion, UK Limited, "Design Consideration for E-PDCCH," 3GPP TSG RAN WG1 Meeting #66, R1-112373, Aug. 26, 2011 see section 2.

* cited by examiner

METHOD AND APPARATUS FOR TRANSCEIVING A DOWNLINK CONTROL CHANNEL IN A WIRELESS COMMUNICATION SYSTEM

This application is a National Stage Application of International Application No. PCT/2012/010619, filed Dec. 7, 2012, and claims priority to and the benefit of U.S. Provisional Application No. 61/568,109, filed on Dec. 7, 2011, the disclosures of which are incorporated by reference herein in their entirety.

TECHNICAL FIELD

The present invention relates to a wireless communication system, and more particularly, to a method and apparatus for transmitting and receiving a downlink control channel.

BACKGROUND ART

In an existing wireless communication system, a base station may provide a user equipment (UE) with scheduling information for uplink transmission and/or downlink reception of the UE, for example, via a physical downlink control channel (PDCCH). In the existing wireless communication system, resources used to transmit the downlink control channel are restricted to a specific resource region.

As compared to the existing wireless communication system, increased transmit capacity support, improved inter-cell interference coordination, multi-node system support, coordinated multi-point (CoMP), multi user-multiple input multiple output (MU-MIMO) support, etc. is required. Restriction on the location of the resources used to transmit the downlink control channel in the existing wireless communication system may not be suitable for such requirements. Accordingly, introduction of a new downlink control channel, which is transmitted at a physical resource location different from that of a downlink control channel transmission region defined in the existing wireless communication system, is being discussed.

DISCLOSURE

Technical Problem

An object of the present invention devised to solve the problem lies in a transmission resource configuration method for efficiently transmitting a new downlink control channel. In addition, another object of the present invention devised to solve the problem lies in a method for increasing resource use efficiency by accurately detecting an allocation resource region of a new downlink control channel. In addition, another object of the present invention devised to solve the problem lies in a method for increasing resource use efficiency by enabling a specific UE to accurately detect information about allocation of a new downlink control channel of another UE as well as a new downlink control channel of the specific UE, when a downlink data channel is configured using a multiple user-multiple input multiple output (MU-MIMO) method.

The technical problems solved by the present invention are not limited to the above technical problems and other technical problems which are not described herein will become apparent to those skilled in the art from the following description.

Technical Solution

The object of the present invention can be achieved by providing a method for, at a base station, transmitting a downlink control channel to a user equipment (UE) in a wireless communication system including transmitting one or more enhanced-physical downlink control channels (E-PDCCHs) in an E-PDCCH allocable resource region and transmitting E-PDCCH allocation resource information of the one or more E-PDCCHs to the UE, wherein the E-PDCCH allocation resource information indicates resources, in which the one or more E-PDCCHs are present, in the E-PDCCH allocable resource region, and wherein a valid physical downlink shared channel (PDSCH) allocation resource region for the UE is determined based on the E-PDCCH allocation resource information.

In another aspect of the present invention, provided herein is a method for, at a user equipment (UE), receiving a downlink control channel from a base station in a wireless communication system including detecting an enhanced-physical downlink control channel (E-PDCCH) in an E-PDCCH allocable resource region and receiving E-PDCCH allocation resource information from the base station, wherein the E-PDCCH allocation resource information indicates resources, in which one or more E-PDCCHs are present, in the E-PDCCH allocable resource region, and wherein a valid physical downlink shared channel (PDSCH) allocation resource region for the UE is determined based on the E-PDCCH allocation resource information.

In another aspect of the present invention, provided herein is a base station apparatus for transmitting a downlink control channel to a user equipment (UE) in a wireless communication system including a reception module, a transmission module and a processor, wherein the processor is configured to transmit one or more enhanced-physical downlink control channels (E-PDCCHs) in an E-PDCCH allocable resource region using the transmission module and to transmit E-PDCCH allocation resource information of the one or more E-PDCCHs to the UE using the transmission module, wherein the E-PDCCH allocation resource information indicates resources, in which the one or more E-PDCCHs are present, in the E-PDCCH allocable resource region, and wherein a valid physical downlink shared channel (PDSCH) allocation resource region for the UE is determined based on the E-PDCCH allocation resource information.

In another aspect of the present invention, provided herein is a user equipment (UE) apparatus for receiving a downlink control channel from a base station in a wireless communication system including a reception module, a transmission module and a processor, wherein the processor is configured to detect an enhanced-physical downlink control channel (E-PDCCH) in an E-PDCCH allocable resource region and to receive E-PDCCH allocation resource information from the base station using the reception module, wherein the E-PDCCH allocation resource information indicates resources, in which one or more E-PDCCHs are present, in the E-PDCCH allocable resource region, and wherein a valid physical downlink shared channel (PDSCH) allocation resource region for the UE is determined based on the E-PDCCH allocation resource information.

The following features are applicable to the embodiments of the present invention.

The valid PDSCH allocation resource region may be determined as a resource region except for a resource region in which the one or more E-PDCCHs are determined to be present based on the E-PDCCH allocation resource information, in a PDSCH allocation resource region indicated by downlink control information provided via the E-PDCCH of the UE.

The one or more E-PDCCHs may include a plurality of E-PDCCHs for a plurality of UEs participating in multiple user-multiple input multiple output (MU-MIMO).

The one or more E-PDCCHs may include a plurality of E-PDCCHs of one UE.

After the E-PDCCH allocation resource information is transmitted to the UE, an additional E-PDCCH for the UE may be detected in a resource region, in which the one or more E-PDCCHs are determined to be present based on the E-PDCCH allocation resource information.

The E-PDCCH allocation resource information may be included in downlink control information transmitted via the E-PDCCH.

The E-PDCCH allocation resource information may be provided to the UE via higher layer signaling.

The E-PDCCH allocation resource information may be configured as a bitmap.

The bitmap may be configured at an enhanced-control channel element (E-CCE) level.

The bitmap may be configured at a resource block level.

If downlink system bandwidth includes a plurality of partitions, the E-PDCCH allocable resource region may be configured as a set of partial resource regions of each of the plurality of partitions.

The plurality of partitions may is a plurality of subbands and one subband may include a plurality of resource blocks.

It is to be understood that both the foregoing general description and the following detailed description are merely exemplary of the invention, and are intended to provide an overview or framework for understanding the nature and character of the invention as it is claimed.

Advantageous Effects

According to the present invention, it is possible to provide a transmission resource configuration method for efficiently transmitting a new downlink control channel. According to the present invention, it is possible to provide a method for increasing resource use efficiency by accurately detecting an allocation resource region of a new downlink control channel. In addition, according to the present invention, it is possible to provide a method for increasing resource use efficiency by enabling a specific UE to accurately detect information about allocation of a new downlink control channel of another UE as well as a new downlink control channel of the specific UE, when a downlink data channel is configured using a multiple user-multiple input multiple output (MU-MIMO) method.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Figure 1:
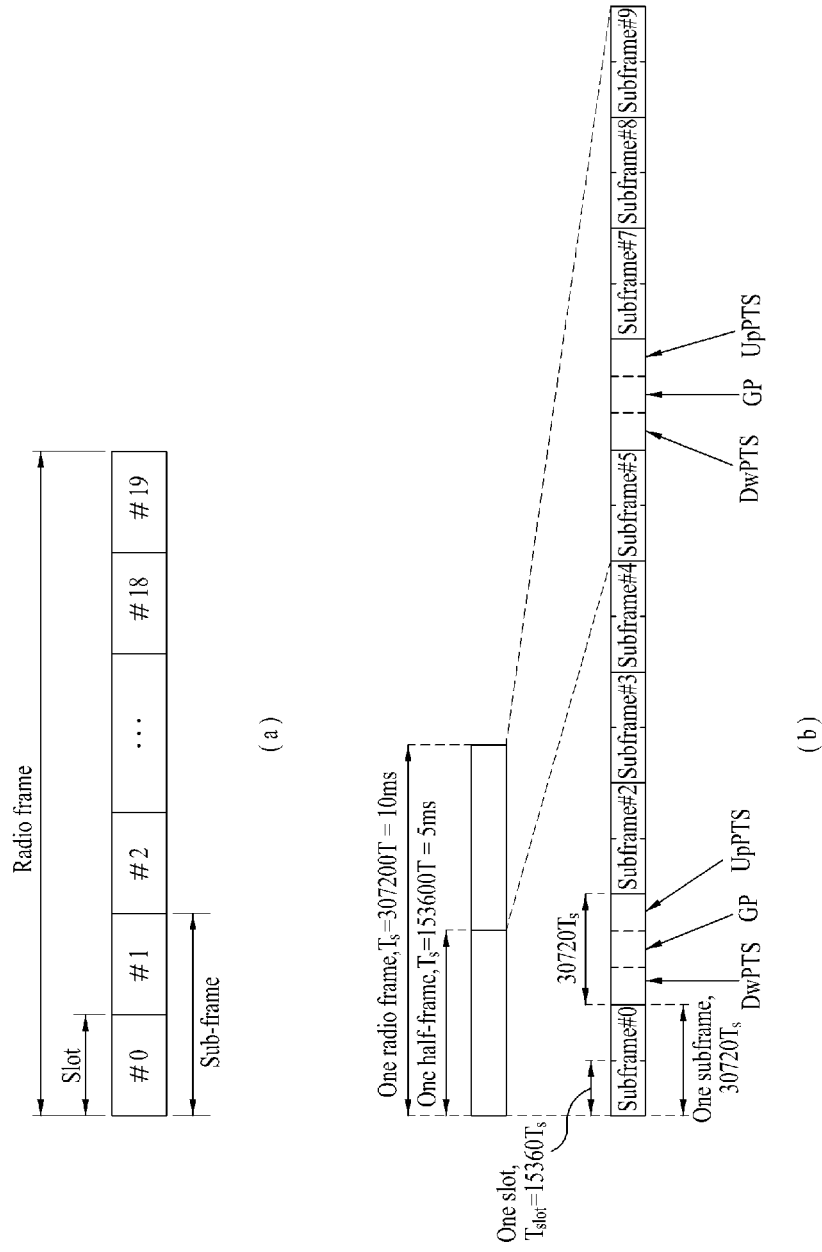
FIG. 1 is a diagram illustrating the structure of a radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point (AP) as necessary. The term "relay" may be replaced with the terms relay node (RN) or relay station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and LTE-A. However, the technical spirit of the present invention is not limited thereto.

The structure of a radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A downlink radio frame includes 10 subframes, and one subframe includes two slots in time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, and thus the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

FIG. 1(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation of a base station and uplink transmission synchronization of the user equipment. The guard period is used to remove interference occurring in an uplink due to multi-path delay of a downlink signal between the uplink and a downlink. Meanwhile, one subframe includes two slots regardless of type of the radio frame.

The structure of the radio frame is only exemplary. Accordingly, the number of subframes included in the radio frame, the number of slots included in the subframe or the number of symbols included in the slot may be changed in various manners.

Figure 2:
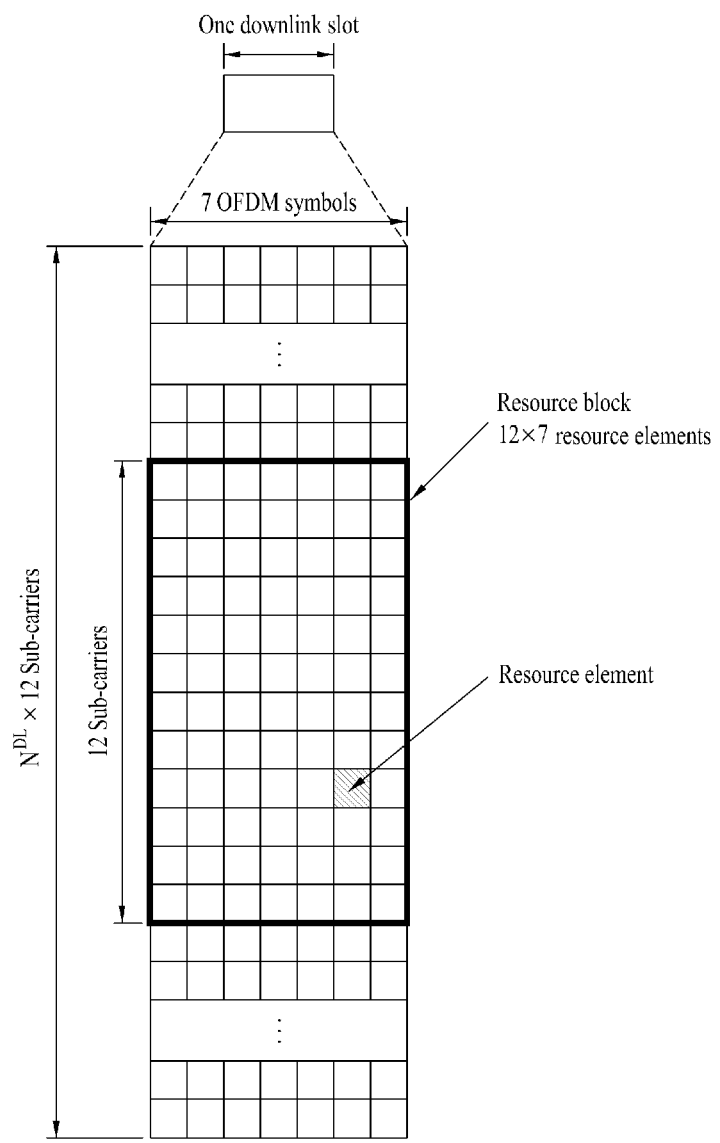
FIG. 2 is a diagram showing a resource grid.

FIG. 2 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 3:
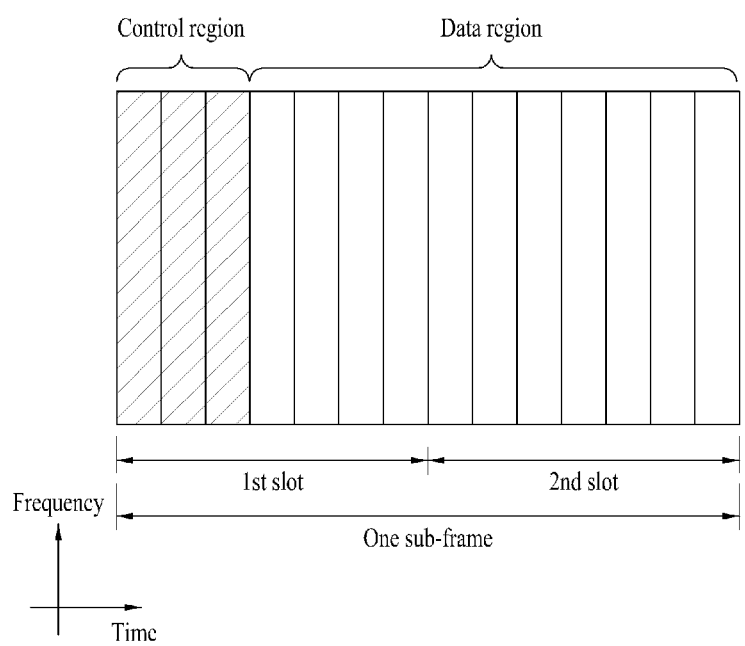
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for an arbitrary UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in an arbitrary UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
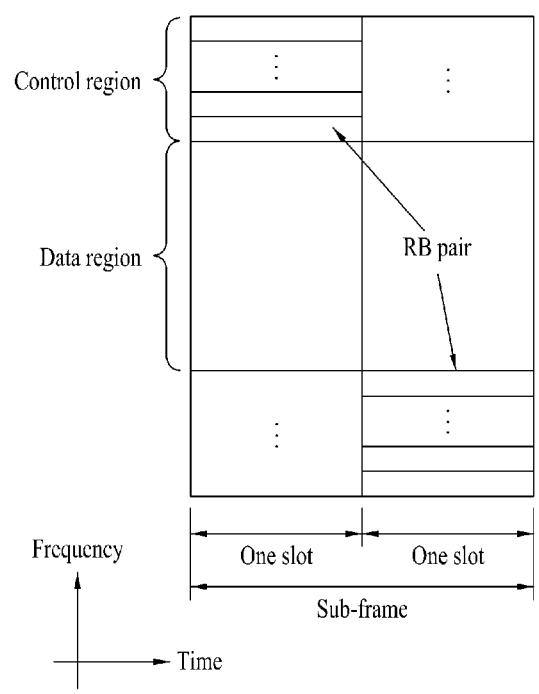
FIG. 4 is a diagram showing the structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific UE. It is possible to provide information for channel estimation and demodulation using such RSs.

The reception side (UE) estimates the channel state from the CRS and feeds an indicator associated with channel quality, such as a Channel Quality Indicator (CQI), a Precoding Matrix Index (PMI) and/or a Rank Indicator (RI), back to the transmission side (base station). The CRS may be also called a cell-specific RS. Alternatively, an RS associated with the feedback of Channel State Information (CSI) such as CQI/PMI/RI may be separately defined as a CSI-RS.

The DRS may be transmitted through REs if demodulation of data on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DRS).

Figure 5:
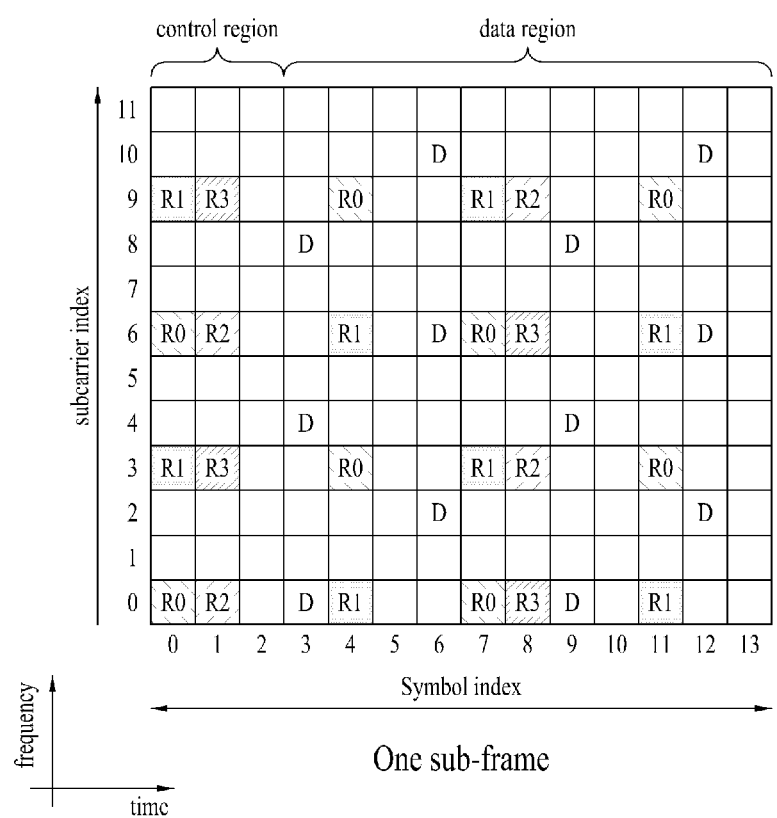
FIG. 5 is a diagram illustrating a downlink reference signal.

FIG. 5 is a diagram showing a pattern of CRSs and DRSs mapped onto a downlink RB pair defined in the legacy 3GPP LTE system (e.g., Release-8). The downlink RB as a mapping unit of the RSs may be expressed in units of one subframe in a time domain×12 subcarriers in a frequency domain. That is, on the time axis, one RB has a length of 14 OFDM symbols in case of the normal CP and has a length of 12 OFDM symbols in case of the extended CP. FIG. 5 shows an RB pair in case of the normal CP.

FIG. 5 shows the locations of the RSs on the RB pairs in the system in which the base station supports four transmission antennas. In FIG. 5, Resource Elements (REs) denoted by "R0", "R1", "R2" and "R3" indicate the locations of the CRSs of the antenna port indices 0, 1, 2 and 3, respectively. In FIG. 5, the RE denoted by "D" indicates the location of the DRS.

Hereinafter, the CRS will be described in detail. The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (base station). The 3GPP LTE (e.g., Release-8) system supports various antenna configurations, and a downlink signal transmission side (base station) has three antenna configurations such as a single antenna, two transmit antennas and four transmit antennas. If the base station performs single-antenna transmission, RSs for a single antenna port are arranged. If the base station performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the base station performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or multiple user-MIMO (MU-MIMO).

If multiple antennas are supported, when RSs are transmitted from a certain antenna port, the RSs are transmitted at the locations of the REs specified according to the RS pattern and no signal is transmitted at the locations of the REs specified for another antenna port.

The rule of mapping the CRSs to the RBs is defined by Equation 1

$$k = 6m + (v + v_{shift}) \bmod 6$$

$$l = \begin{cases} 0, n_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Equation 1

In Equation 1, k denotes a subcarrier index, 1 denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to cell.

More specifically, in order to increase channel estimation performance through the CRS, the location of the CRS in the frequency domain may be differently shifted according to cell. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting means that the RSs are transmitted using higher power by bringing the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indices 0 and 4 of the slot in case of the normal CP and are located on symbol indices 0 and 3 of the slot in case of the extended CP. Only RSs for a maximum of two antenna ports are defined in one OFDM symbol. Accordingly, upon four-transmit antenna transmission, the RSs for the antenna ports 0 and 1 are located on the symbol indices 0 and 4 (the symbol indices 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transfer channel and the precoding weight transmitted from each transmit antenna are combined, when the UE receives the RSs.

The legacy 3GPP LTE system (e.g., Release-8) supports four-transmit antenna transmission as a maximum and the DRS for Rank 1 beamforming is defined. The DRS for Rank 1 beamforming is also denoted by the RS for the antenna port index 5. The rule of the DRS mapped on the RBs is defined by Equation 2. Equation 2 is for the normal CP.

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

Equation 2

In Equation 2, k denotes a subcarrider index, 1 denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the legacy 3GPP LTE (e.g., Release-8) system, DRSs for two or more layers may be defined in order to support data transmission through the added antenna.

Figure 6:
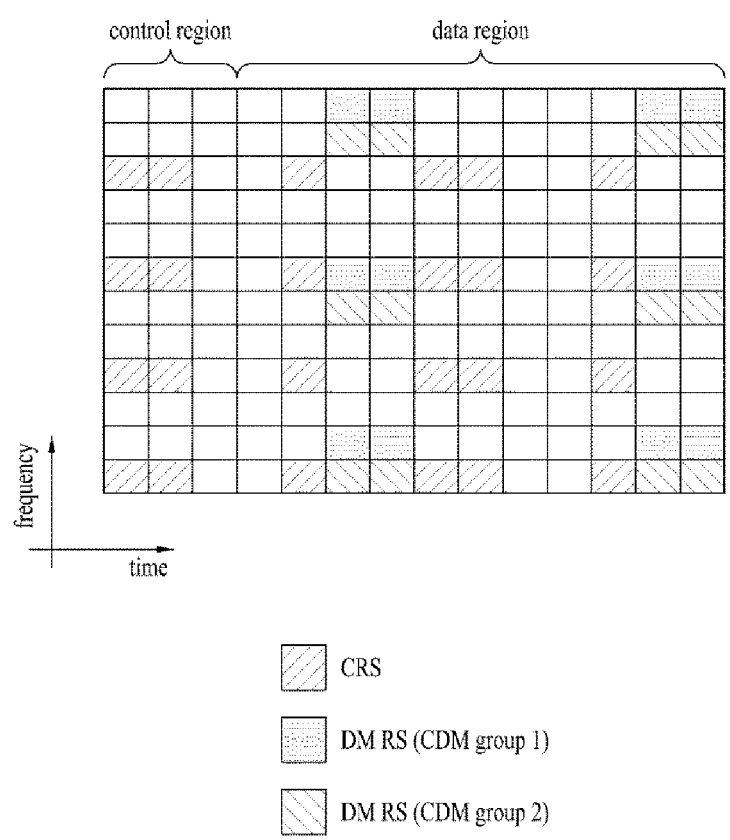
FIG. 6 is a diagram showing an example of a DMRS pattern defined in an LTE-A system.

FIG. 6 is a diagram showing an example of a DMRS pattern defined in an LTE-A system.

FIG. 6 shows the locations of resource elements on which DMRSs are transmitted on one RB pair (in the normal CP, 14 OFDM symbols in time domain×12 subcarriers in frequency domain) on which downlink data is transmitted. The DMRSs may be transmitted via eight antenna ports (antenna port indices 7 to 14) additionally defined in an LTE-A system. The DMRSs for different antenna ports may be located on different frequency resources (subcarriers) and/or different time resources (OFDM symbols) and thus may be distinguished (which may be multiplexed using an FDM and/or TDM scheme). In addition, DMRSs for different antenna ports located on the same time-frequency resources may be distinguished by orthogonal code (which may be multiplexed using a CDM scheme).

In an enhanced wireless communication system (e.g., an LTE-A system), separate reference signals (CSI-RSs) for channel state information (CSI) measurement for new antenna ports are defined.

Figure 7:
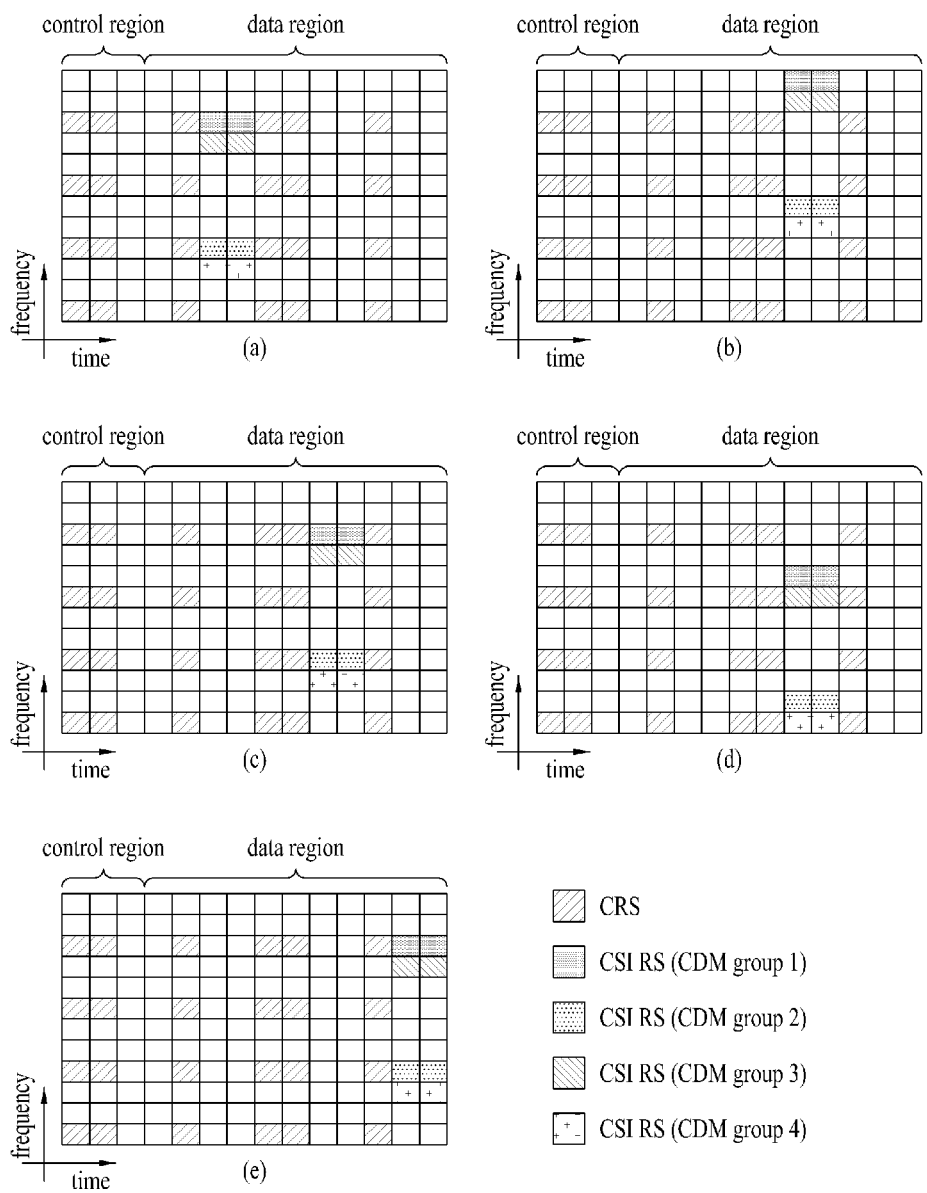
FIG. 7 is a diagram showing examples of a CSI-RS pattern defined in an LTE-A system.

FIG. 7 is a diagram showing examples of a CSI-RS pattern defined in an LTE-A system. FIG. 7 shows the locations of resource elements on which CSI-RSs are transmitted on one RB pair (in the normal CP, 14 OFDM symbols in time domain×12 subcarriers in frequency domain) on which downlink data is transmitted. In a certain downlink subframe, a CSI-RS pattern of one of FIGS. 7(a) to 7(e) may be used. The CSI-RS may be transmitted via eight antenna ports (antenna port indices 15 to 22) additionally defined in an LTE-A system. CSI-RSs for different antenna ports may be located on different frequency resources (subcarriers) and/or different time resources (OFDM symbols) and may be distinguished (which may be multiplexed using an FDM and/or TDM scheme). In addition, CSI-RSs for different antenna ports located on the same time-frequency resources may be distinguished by orthogonal code (which may be multiplexed using a CDM scheme). In the example of FIG. 7(a), CSI-RSs for antenna ports 15 and 16 may be located on REs denoted by CSI-RS CDM group 1 and may be multiplexed by orthogonal code. In the example of FIG. 7(a), CSI-RSs for antenna ports 17 and 18 may be located on REs denoted by CSI-RS CDM group 2 and may be multiplexed by orthogonal code. In the example of FIG. 7(a), CSI-RSs for antenna ports 19 and 20 may be located on REs denoted by CSI-RS CDM group 3 and may be multiplexed by orthogonal code. In the example of FIG. 7(a), CSI-RSs for antenna ports 21 and 22 may be located on REs denoted by CSI-RS CDM group 4 and may be multiplexed by orthogonal code. The principle applied to FIG. 7(a) is equally applicable to FIGS. 7(b) to 7(e).

The RS patterns of FIGS. 5 to 7 are merely exemplary and are not limited to a specific RS pattern in various embodiments of the present invention. The various embodiments of the present invention are equally applicable to the case in which RS patterns different from FIGS. 5 to 7 are defined and used.

PDCCH Processing

A control channel element (CCE), which is a successive logical allocation unit, is used when PDCCHs are mapped to REs. One CCE includes a plurality (e.g., 9) of resource element groups (REGs) and one REG is composed of four neighboring resource elements (REs) in a state of excluding a reference signal (RS).

The number of CCEs necessary for a specific PDCCH is changed according to DCI payload, which is the size of control information, cell bandwidth, channel coding rate, etc. More specifically, the number of CCEs for a specific PDCCH may be defined according to PDCCH format as shown in Table 1 below.

TABLE 1

| PDCCH format | Number of CCEs | Number of REGs | Number of bits of PDCCH |
|---|---|---|---|
| 0 | 1 | 9 | 72 |
| 1 | 2 | 18 | 144 |
| 2 | 4 | 36 | 288 |
| 3 | 8 | 72 | 576 |

A PDCCH may use any one of the four formats described above. However, a UE is not informed of the PDCCH format. Accordingly, the UE should perform decoding in a state of being unaware of the PDCCH format, which is referred to as blind decoding. When the UE decodes all possible CCEs used for downlink with respect to each PDCCH format, a large burden is imposed on the UE. Therefore, a search space is defined in consideration of scheduling restrictions and the number of decoding attempts.

That is, the search space is a set of PDCCH candidates including CCEs which should be decoded by the UE at a given aggregation level. Here, the aggregation level and the number of PDCCH candidates may be defined as shown in Table 2 below.

TABLE 2

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since four aggregation levels are present, the UE has a plurality of search spaces according to aggregation level. As shown in Table 2 above, the search space may be divided into a UE-specific search space and a common search space. The UE-specific search space is used for specific UEs. Each UE may monitor the UE-specific search space (attempt decoding of the set of PDCCH candidates according to possible DCI format), check an RNTI and CRC masked to a PDCCH, and acquire control information if the RNTI and CRC are valid.

The common search space is used when a plurality of UEs or all UEs need to receive a PDCCH for dynamic scheduling of system information or paging message. The common search space may be used for a specific UE for resource management. In addition, the common search space may overlap the UE-specific search space.

As described above, the UE attempts decoding with respect to the search space and the number of decoding attempts is determined by a transmission mode determined via DCI format and RRC signaling. If carrier aggregation is not applied, since the UE considers two DCI sizes (DCI format 0/1A/3/3a and DCI format 1C) with respect to six PDCCH candidates in the common search space, a maximum of 12 decoding attempts is necessary. In the UE-specific search space, since two DCI sizes are considered with respect to the number (6+6+2+2=16) of PDCCH candidates, a maximum of 32 decoding attempts is necessary. Accordingly, if carrier aggregation is not applied, a maximum of 44 decoding attempts is necessary.

Enhanced Physical Downlink Control Channel

In 3GPP LTE-A Release-11 (Rel-11) system and up, introduction of a mult-node system including a plurality of access nodes within a cell has been decided for performance improvement. For example, the multi-node system may include a distributed antenna system (DAS), a radio remote head (RRH), a distributed multi-node system (DMNS), etc. Methods for applying various MIMO schemes and cooperative communication schemes (e.g., CoMP) to the multi-node system have been developed. Here, in order to apply the various MIMO schemes and cooperative communication schemes to the multi-node environment, introduction of a new control channel different from an existing PDCCH is required. For example, although the existing PDCCH carries only control information of one cell/node, since several cells/nodes participate in transmission to one UE in the multi-node system, the amount of control information may increase. Since the capacity of the existing PDCCH is restricted, it is difficult to support delivery of an increased amount of control information. Thus, in order to solve this problem, introduction of a new control channel is required.

A new downlink control channel may be referred to as an enhanced PDCCH (E-PDCCH). The E-PDCCH corresponds to a new type of control channel carrying DCI, such as scheduling allocation for a UE, and may be introduced in order to efficiently support a scheme such as inter-cell interference control coordination (ICIC), multi-node system, coordinated multi-point (CoMP), MU-MIMO, etc.

The E-PDCCH is distinguished from the existing PDCCH in that the E-PDCCH is allocated to a time-frequency resource region (e.g., a data region of FIG. 3) except for a region (e.g., a control region of FIG. 3) defined for PDCCH transmission in a legacy LTE/LTE-A system (Hereinafter, the existing PDCCH is referred to as a legacy-PDCCH in order to be distinguished from the E-PDCCH). For example, in mapping of E-PDCCHs to resource elements, E-PDCCHs are mapped to OFDM symbols except for the first N (N≤3) OFDM symbols in the time domain and are mapped to a set of semi-statically allocated RBs in the frequency domain.

The UE may perform a blind decoding process to detect whether the E-PDCCH thereof is transmitted. Here, if the number of UEs accessing a specific cell/node increases, a larger number of E-PDCCHs should be allocated to a PDSCH region. In this case, complexity of blind decoding to be performed by the UE may increase.

As described above, the legacy PDCCH is transmitted in the common search space (CSS) and the UE-specific search space (USS) within restricted resources (first to third OFDM symbols). In the E-PDCCH, resource allocation of an RB unit is assumed and control information is transmitted via resources significantly greater in amount than resources used for the legacy PDCCH, thereby obtaining larger coding gain.

In addition, as the resource allocation method of the E-PDCCH, a distributed allocation method or a localized allocation method is applicable according to UE mobility or Doppler spread. For example, when the UE moves a high speed or has a high Doppler spread, the distributed allocation method is applicable and, when the UE moves a low speed or has a low Doppler spread, the localized allocation method is applicable. For example, if control information is provided to a UE having low mobility via an E-PDCCH, the beam applied to the PDSCH is equally applicable to the E-PDCCH such that the UE may obtain additional beam gain.

If the same control information transmission scheme as the legacy PDCCH is considered in the E-PDCCH, the E-PDCCH may be transmitted in a region having relatively high channel quality (e.g., signal-to-noise plus interference ratio (SINR)) due to increased coding gain and beam gain in a specific situation. This is not preferable in terms of resource efficiency. For example, according to multiplexing experimental result for the E-PDCCH in R1-113195, "Performance evaluation of multiplexing schemes for enhanced PDCCH transmission", LG Electronics (3GPP TSG RAN WG1 Meeting #66bis, Zhuhai, China, $10^{th}$-$14^{th}$October 2011), if DCI format 1A is transmitted via the E-PDCCH, since MU-MIMO UEs as well as single user-MIMO (SU-MIMO) UEs transmit control information at an aggregation level 1, resources may not be efficiently used.

Figure 8:
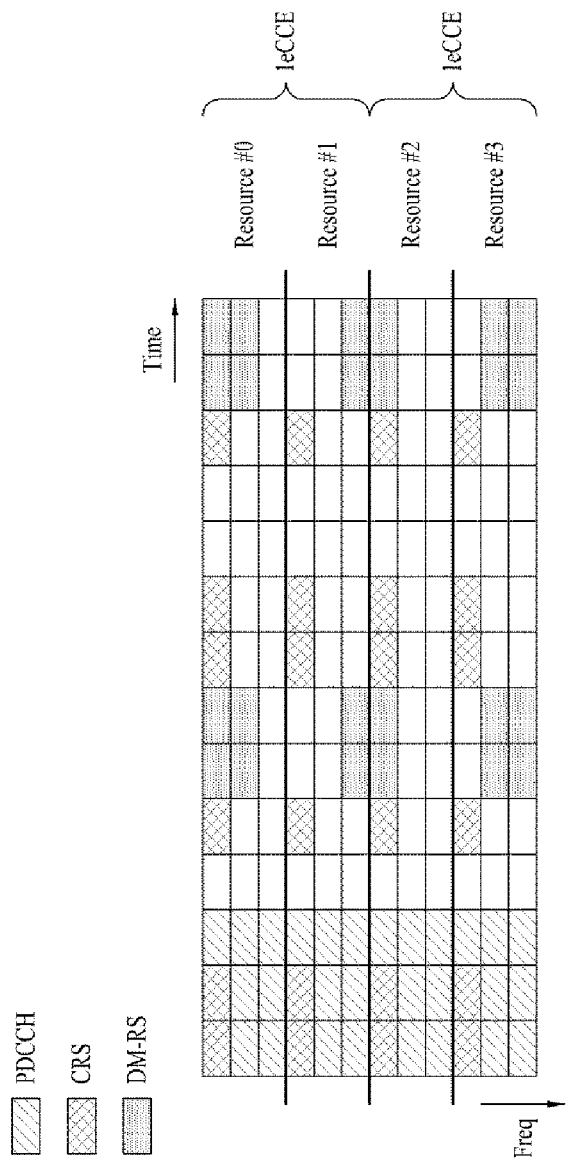
FIG. 8 is a diagram showing an example of an E-PDCCH allocation method.

FIG. 8 is a diagram showing an example of an E-PDCCH allocation method.

Similarly to definition of legacy-PDCCH transmission as an integer multiple (that is, aggregation level 1, 2, 4 or 8) of a control channel element (CCE), E-PDCCH transmission may be defined as an integer multiple of a CCE or a newly defined enhanced-CCE (E-CCE). In FIG. 8, although an E-PDCCH allocable region is divided into four resources #0 to #3 in one RB pair, the present invention is not limited thereto and one or more E-PDCCH allocation resources may be configured in one RB pair.

Here, a method for transmitting one E-CCE of aggregation level 1 within one RB pair is referred to as a localized allocation method and a method for distributing and transmitting one E-CCE of aggregation level 1 within several RB pairs is referred to as a distributed allocation method.

For example, according to the localized allocation method (or non-interleaving method) of the E-PDCCH, one E-CCE of aggregation level 1 may be allocated to two resources (e.g., resources #0 and #1 of FIG. 8) per RB pair.

Figure 9:
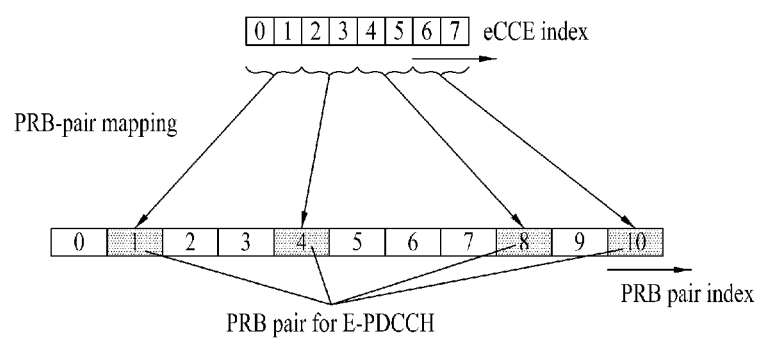
FIG. 9 is a diagram showing an example of a localized allocation method of an E-PDCCH.

FIG. 9 is a diagram showing an example of a localized allocation method of an E-PDCCH. In the example of FIG. 9, as described with reference to FIG. 8, assume that one RB pair is divided into four resources. In the example of FIG. 9, if it is assumed that indices of physical resource block (PRB) pairs to which the E-PDCCH is allocable are 1, 4, 8 and 10, E-CCEs 0 and 1 may be allocated to the PRB pair 1 and, for example, E-CCE 0 may be allocated to resources #0 and #1 of the PRB pair 1 and E-CCE 1 may be allocated to resources #2 and #3 of the PRB pair 1. Similarly, E-CCEs 2 and 3 may be allocated to the PRB pair index 4, E-CCEs 4 and 5 may be allocated to the PRB pair index 8 and E-CCEs 6 and 7 may be allocated to the PRB pair index 10.

According to the distributed allocation method of the E-PDCCH, one E-CCE of aggregation level 1 may be distributed and allocated to two RB pairs.

Figure 10:
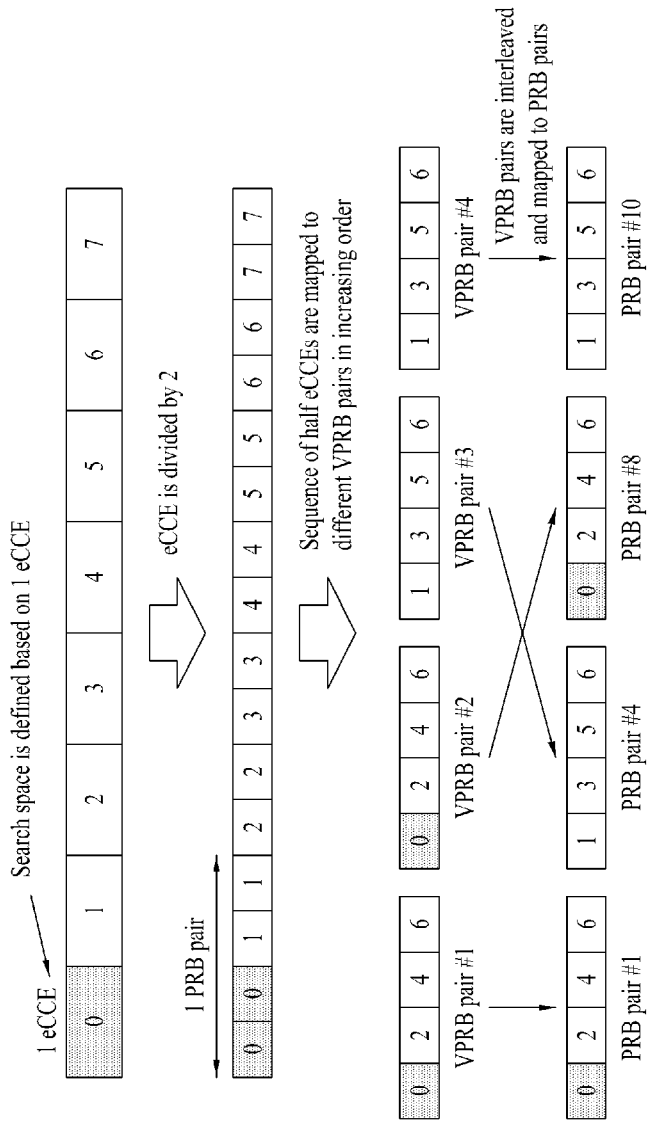
FIG. 10 is a diagram showing an example of a distributed allocation method of an E-PDCCH.

FIG. 10 is a diagram showing an example of a distributed allocation method of an E-PDCCH. As described with reference to FIG. 8, assume that one RB pair is divided into four resources. In the example of FIG. 10, one E-CCE is divided by 2, interleaved and mapped to virtual resource block (VRB) pairs. Here, one VRB may be mapped to one PRB and VRB-to-VRB mapping rule (e.g., interleaving of VRB index) may be defined using a predetermined method. Accordingly, one E-CCE is divided by 2 and may be mapped to different PRB pairs. For example, E-CCE 0 may be divided and allocated to VRB pairs #1 and #2 and, as a result, E-CCE 0 may be divided and allocated to PRB pairs #1 and #8 according to the VRB-to-PRB mapping rule. Similarly, E-CCE 1 is divided and allocated to PRB pairs #4 and #10, E-CCE 2 may be divided and allocated to PRB pairs #1 and #8, E-CCE 3 may be divided and allocated to PRB pairs #4 and #10, E-CCE 4 may be divided and allocated to PRB pairs #1 and #8, E-CCE 5 may be divided and allocated to PRB pairs #4 and #10, E-CCE 6 may be divided and allocated to PRB pairs #1 and #8, and E-CCE 7 may be divided and allocated to PRB pairs #4 and #10.

Hereinafter, RB pairs, to which the localized allocation method is applied, are referred to as a localized allocation region and RB pairs, to which the distributed allocation method is applied, are referred to as a distributed allocation region. For example, the localized allocation method is applicable for the purpose of providing frequency selective gain and beamforming gain to a UE which moves at low speed to improve link quality and the distributed allocation method is applicable for the purpose of robustly transmitting a unicast channel to a UE which moves at high speed or a broadcast/multicast channel to a plurality of UEs.

An enhanced-REG (E-REG) may be used to define a resource element to which the E-PDCCH is mapped. For example, with respect to one PRB pair, 16 E-REGs (that is, from E-REG 0 to E-REG 15) may be present. On one PRB, REs other than REs, to which DMRSs are mapped on one PRB, are numbered 0 to 15. The numbering order is increasing order of frequency or increasing order of time. For example, REs numbered i configure one E-REG i.

The E-PDCCH may be transmitted using an aggregate of one or a plurality of E-CCEs. Each E-CCE may include one or a plurality of E-REGs. The number of E-REGs per E-CCE may be 4 or 8, for example (4, in case of a normal subframe of normal CP).

E-CCEs available for the E-PDCCH may be numbered 0 to $N_{ECCE}-1$. The value of $N_{ECCE}$ may be 1, 2, 4, 8, 16 or 32, for example.

The number of REs of the PRB pairs configured for transmission of the E-PDCCH may be defined by the number of REs satisfying the following conditions i), ii) and ii): i) the RE is one of 16 E-REGs of the PRB pair, ii) the RE is not used for CRS or CSI-RS and iii) the RE belongs to an OFDM symbol, the index of which is equal to or greater than the index of an OFDM symbol on which the E-PDCCH starts to be transmitted.

As described above, the E-PDCCH may be mapped to REs using the localized method or the distributed method. The E-PDCCH may be mapped to REs satisfying the following conditions a) to d): a) the RE is some of the E-REG allocated for transmission, b) the RE is not some of the RPB pair used for transmission of a physical broadcast channel (PBCH) or a synchronization signal, c) the RE is not used for a CRS or a CSI-RS for a specific UE and d) the RE belongs to an OFDM symbol, the index of which is equal to or greater than the index of an OFDM symbol on which the E-PDCCH starts to be transmitted. For allocation of the E-PDCCH, one or a plurality of E-PDCCH-PRB sets may be configured and provided to the UE via higher layer signaling from the base station. For example, the E-PDCCH-PRB-set may be used to monitor the E-PDCCH.

Resource Allocation Method of E-PDCCH

As described above, as a resource allocation method of an E-PDCCH, a localized allocation method and a distributed allocation method may be defined. However, although the allocation method is defined, to which PRB of a PDSCH region an E-PDCCH is allocated is not defined. In the present invention, for more efficient transmission of E-PDCCHs, a detailed method for determining E-PDCCH allocable resources is proposed.

In the present invention, assume that a region in which E-PDCCHs may be transmitted is divided into a localized allocation region and a distributed allocation region.

Here, detailed definition of the localized allocation region and the distributed allocation region are shown in Table 3 below. That is, in the present invention, the term "localized allocation region" may be understood as a region having features described in the left column of Table 3 below and the term "distributed allocation region" may be understood as a region having features described in the right column of Table 3 below.

TABLE 3

| | Localized allocation region | Distributed allocation region |
|---|---|---|
| 1 | An E-PDCCH of a minimum aggregation level is transmitted on one RB pair. | An E-PDCCH of a minimum aggregation level is divided and transmitted on several RB pairs. |
| 2 | One CCE/E-CCE is configured or mapped within or to one RB pair. | One CCE/E-CCE is divided and configured or mapped within or to several RB pairs. |
| 3 | A search space of an E-PDCCH is configured or mapped on or to successive RB pairs. | A search space of an E-PDCCH is configured or mapped on or to distributed RB pairs. |
| 4 | If N DMRS ports are present, the E-PDCCH of one UE is transmitted via only some of the N DMRS ports. | If N DMRS ports are present, the E-PDCCH of one UE is transmitted via all the N DMRS ports. |
| 5 | Region which is set to be searched for by a UE set as a transmission mode (TM) corresponding to a closed loop-MIMO operation. | Region which is set to be searched for by a UE set as a transmission mode (TM) corresponding to an open loop-MIMO operation (or transmit diversity or open loop-space multiplexing) or in which (or fallback) DCI format 1A is searched for. |
| 6 | Region in which an E-PDCCH transmitted via one layer is searched for. | Region in which an E-PDCCH, to which space-frequency block coding (SFBC)/space-time block coding (STBC) is applied, is searched for. |
| 7 | Beamforming (or adaptive beamforming) is applied. | Transmit diversity (SFBC/STBC or non-adaptive beamforming) is applied. |

In 5 of Table 3 above, closed loop-MIMO means a MIMO scheme which is performed at a transmitter side in consideration of feedback information from a receiver side and open loop-MIMO means a MIMO scheme which is performed at a transmitter side without considering feedback information of a receiver side.

In the following description, a method for configuring or determining a localized allocation region (that is, an available resource region to which an E-PDCCH is allocable using a localized allocation method) will first be described. In the following description, as shown in FIG. 8, assume that a maximum of two E-CCEs may be transmitted on one RB pair. However, the scope of the present invention is not limited thereto and the principle of the present invention is equally applicable to the case in which one or more E-CCEs may be transmitted on one RB pair.

First, the method for configuring a localized allocation region of an E-PDCCH according to the present invention will be described. According to the present invention, an E-PDCCH allocable region may be configured on specific RBs of divided parts (that is, partitions) in the frequency domain.

More specifically, all resource regions to which an E-PDCCH of a specific UE is allocable using a localized allocation method are not present on successive PRBs but may be a set of RBs satisfying a specific condition. Although the E-PDCCH allocable region is not successive, the E-PDCCH is allocated using the localized allocation method because one E-PDCCH of a specific UE is allocated on successive resources in the E-PDCCH allocable resource region.

Figure 11:
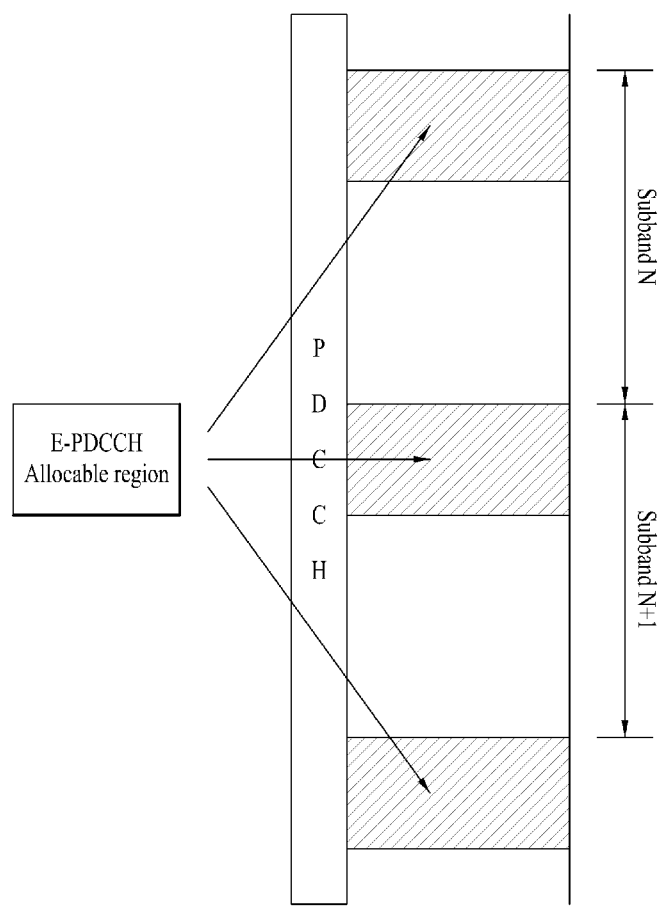
FIG. 11 is a diagram showing an example of a local type E-PDCCH allocable region.

FIG. 11 is a diagram showing an example of a localized type E-PDCCH allocable region.

In FIG. 11, the partition is configured in subband units. The subband may be defined as a subset of an entire system band (or wideband) and the size of one subband may be differently determined according to size of downlink system bandwidth. For example, the size of one subband is defined as 4 RBs if the size of the system bandwidth is 8 to 26 RBs, the size of one subband is defined as 6 RBs if the size of the system bandwidth is 27 to 63 RBs, and the size of one subband is defined as 8 RBs if the size of the system bandwidth is 64 to 110 RBs. The subband may be set for CSI computation/generation in a specific aperiodic CSI report mode (e.g., report mode 3-0 or 3-1). For example, if aperiodic CSI report mode 3-0 is set, the base station may set a set of subbands used when the UE computes/generates CSI and the UE may compute and report CSI (e.g., subband CQI) for each subband belonging to the set of subbands to the base station.

In addition, the partition may be configured in precoding resource block group (PRG) units. The PRG means a resource block group to which the same precoding matrix (or precoding vector) is applied in a FDD system. That is, one PRG may be composed of one or more successive RPBs. For example, the size of one PRG may be defined as 1 RB if the size of the system bandwidth is equal to or less than 10 RBs, the size of one PRG may be defined as 2 RBs if the size of the system bandwidth is 11 to 26 RBs, the size of one PRG may be defined as 3 RBs if the size of the system bandwidth is 27 to 63 RBs, and the size of one PRG may be defined as 2 RBs if the size of the system bandwidth is 64 to 110 RBs.

Although the partition is described as being composed of subbands in the following description, the present invention is not limited thereto and the principle of the present invention is equally applicable to the case in which the partition is composed of PRGs or arbitrary RB groups.

As shown in FIG. 11, the frequency domain may be divided into a plurality of subbands (subbands N, N+1, . . . ) and one or more RB(s) may be set as an E-PDCCH allocable resource region in each of the plurality of subbands (each subband is composed of a plurality of RBs). For example, an RB having a lowest index in one subband may be set as an E-PDCCH allocable resource region. In the example of FIG. 11, the E-PDCCH allocable region is composed of an RB having a lowest index in a subband N, an RB having a lowest index in a subband N+1, an RB having a lowest index in a subband N+2, . . . , etc.

The locations of the E-PDCCH allocable resources may be predefined and shared between a base station and a UE or the base station may set a specific resource region and informs the UE of the specific resource region. In addition, the locations of the E-PDCCH allocable resources may be configured in the form of a bitmap. The level of the bitmap may be configured in partition units (e.g., subband units), RB units, or CCE/E-CCE units. For example, information about the locations of the E-PDCCH allocable resources may be provided to the UE via higher layer signaling. More specifically, a local allocation resource region may be configured as a set of specific RB(s) within each of a plurality of partitions and information about which of the plurality of partitions in system bandwidth corresponds to a local allocation resource region and/or information about which RB(s) in each partition corresponds to a local allocation resource region may be provided to the UE via higher layer signaling. In addition, the E-PDCCH allocable resources may be defined as one or more E-PDCCH-PRB-sets.

Embodiment 1

Embodiment 1 relates to a method for determining a valid PDSCH region at a UE.

If an E-PDCCH allocable region is set as described above, an E-PDCCH of a specific UE may be allocated to some regions. That is, the E-PDCCH allocable region corresponds to a UE-specific E-PDCCH search space for performing E-PDCCH blind decoding of the UE, and the E-PDCCH of the UE may be present in some regions of the E-PDCCH allocable region but the E-PDCCH of the UE may not be present in the remaining regions.

In addition, if the E-PDCCH is present in the local allocation region, the E-PDCCH of the specific UE is preferably present in a PDSCH region of the UE, in order to acquire band selective gain and/or beam gain.

In this case, when MU-MIMO is applied, it is difficult for the specific UE to clearly check whether the E-PDCCH allocable region other than the E-PDCCH region of the specific UE is used for transmission of the PDSCH of the specific UE or used for transmission of an E-PDCCH of another UE.

More specifically, in MU-MIMO operation, an E-PDCCH allocable region and a PDSCH region may be shared among a plurality of UEs. Assume that one PDSCH is transmitted to a plurality of UEs using a MU-MIMO scheme and E-PDCCHs for a plurality of UEs are multiplexed using an FDM scheme. That is, although resource regions in which the plurality of UEs performs E-PDCCH blind decoding may be equally set, the E-PDCCHs of the plurality of UEs are transmitted on different frequency resources. In this case, it is not possible to confirm a valid PDSCH region for a specific UE participating in MU-MIMO operation (that is, a region to which a PDSCH is actually allocated or a PDSCH allocable region except for an actual E-PDCCH allocation region of another UE paired with the specific UE) using existing PDSCH allocation information. Alternatively, if the PDSCH is allocated to resources other than a region in which the E-PDCCH of another UE may be present, resources in which the E-PDCCH of another UE is not actually present may not be used as a PDSCH transmission region, thereby causing resource waste.

For example, in FIG. 11, UE1 detects an E-PDCCH thereof in a first RB of the subband N and, from DCI (e.g., downlink allocation information) included in the detected E-PDCCH, it can be seen that subbands N and N+1 are allocated for transmission of the PDSCH of UE1 (more specifically, transmission of the PDSCHs of UE1 and UE2 in MU-MIMO). In this case, UE1 may not accurately check whether the first RB (that is, the remaining E-PDCCH allocable region) of the subband N+1 is used for transmission of the E-PDCCH of UE2 or for transmission of the PDSCH of UE1.

Since the E-PDCCH for UE2 is present in the first RB of the subband N+1, although the PDSCH is not actually transmitted, if UE1 performs blind decoding on the assumption that the PDSCH is present in the corresponding resource region, PDSCH decoding error may occur. Similarly, if the first RB of the subband N+1 is used for transmission of the PDSCH of UE1, even when PDSCH decoding is performed on the assumption that PDSCH transmission is not performed in the corresponding resource region, PDSCH decoding error may occur. Alternatively, although the first RB of the subband N+1 may be used for transmission of the PDSCH of UE1, if the corresponding resource region is not allocated for PDSCH transmission because the E-PDCCH of UE2 may be present, resources which may be actually used for PDSCH transmission may not be used for PDSCH transmission, thereby causing unnecessary resource waste. That is, when the UE detects the E-PDCCH thereof via blind decoding, if it is not possible to check whether the E-PDCCH allocable region other than the detected resource region is used for transmission of the E-PDCCH another UE (that is, another UE forms a MU-MIMO pair therewith) or for PDSCH transmission, the above-described problems may occur.

Accordingly, in order to eliminate such ambiguity, information indicating whether an E-PDCCH of another UE (e.g., UE2) is present in the E-PDCCH allocable region may be included in control information (that is, DCI) transmitted via the E-PDCCH for UE1. Although two UEs, that is, UE1 and UE2, are assumed as the UEs participating in MU-MIMO, the scope of the present invention is not limited thereto and the principle of the present invention is equally applicable to the case in which two or more UEs form a MU-MIMO pair. For example, it is possible to indicate whether E-PDCCH(s) of UE(s) other than one specific UE are actually present in the E-PDCCH allocable region.

More specifically, the specific UE (e.g., UE1) may perform blind decoding on the E-PDCCH allocable region to detect the E-PDCCH thereof and clearly confirm a part which is recognized as a PDSCH transmission region in the E-PDCCH allocable region of the PDSCH allocation region and a part which is recognized as the E-PDCCH transmission region (that is, the E-PDCCH transmission region(s) of the other UE(s) (e.g., UE)) from DCI on the detected E-PDCCH, thereby increasing resource use efficiency.

In addition, the specific UE (e.g., UE1) may receive information indicating whether the region other than the region, to which the E-PDCCH thereof is allocated, of the E-PDCCH allocable region is a PDSCH region thereof or whether an E-PDCCH of another UE (e.g., UE2) is present via higher layer signaling, when detecting the E-PDCCH in the PDSCH region. The specific UE may clearly determine the valid PDSCH region thereof based on this information.

Embodiment 2

Embodiment 2 relates to a method for indicating whether, in an E-PDCCH allocable region present in a PDSCH allocation region of a specific UE, an additional E-PDCCH (that is, an E-PDCCH for another UE) is present in addition to an E-PDCCH of the specific UE.

The specific UE may perform blind decoding with respect to the E-PDCCH allocable region to detect the E-PDCCH thereof, thereby acquiring allocation information of the PDSCH. If two or more UEs are scheduled within the same PDSCH region (that is, the PDSCH is allocated using a MU-MIMO scheme), E-PDCCHs of two or more UEs may be present in the E-PDCCH allocable regions of the PDSCH region.

Figure 12:
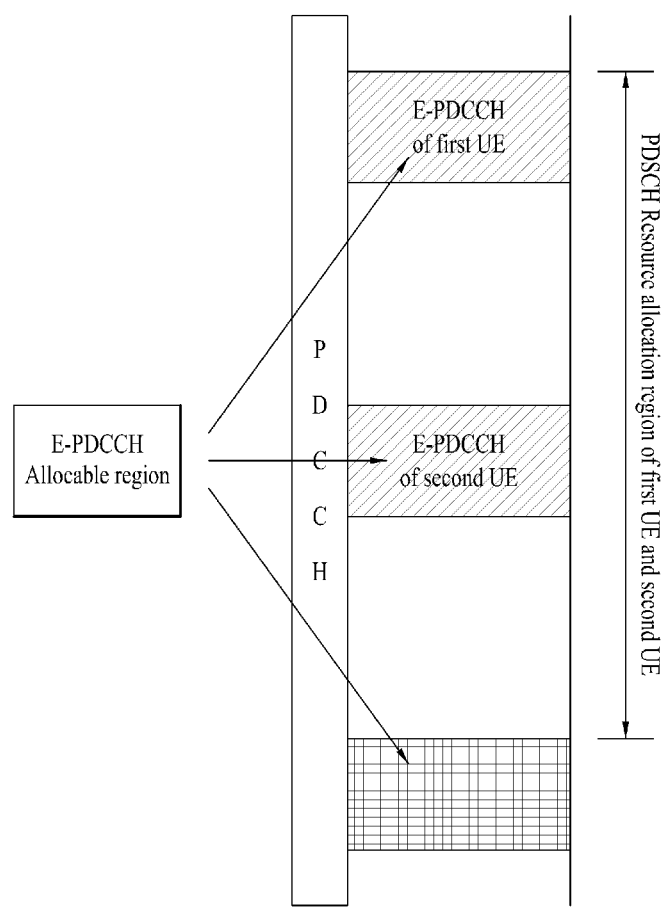
FIG. 12 is a diagram showing an example of allocating an E-PDCCH using an FDM scheme in a PDSCH region in which a plurality of UEs is multiplexed.

FIG. 12 is a diagram showing an example of allocating an E-PDCCH using an FDM scheme in a PDSCH region in which a plurality of UEs is multiplexed.

In FIG. 12, an E-PDCCH of a first UE UE1 and an E-PDCCH of a second UE UE-2 are allocated using an FDM scheme. In this case, UE1 may not use the E-PDCCH region(s) of the other UE(s) (e.g., UE2) forming a MU-MIMO pair therewith as a PDSCH region. In order to increase resource use efficiency of the UE, the regions other than the region, to which the E-PDCCH is actually allocated, of the E-PDCCH allocable region are preferably used for the PDSCH. The specific UE should know information about the region, to which the E-PDCCH(s) of the other UE(s) is actually allocated, in the frequency domain, in order to accurately determine the valid PDSCH region. The information about the region, to which the E-PDCCH(s) of the other UE(s) is actually allocated, may be included in DCI of the E-PDCCH detected by the specific UE via blind decoding or may be provided via higher layer signaling for the specific UE.

Information indicating resources to which the E-PDCCH is actually allocated may be configured in the form of a bitmap. Such bitmap information corresponds to information directly indicating the actual location of the resources, to which the E-PDCCH is actually allocated, of the E-PDCCH allocable region, and the resources, to which the E-PDCCH is actually allocated, may be configured to indicate a union of resources, to which the E-PDCCHs of all UEs participating in MU-MIMO are allocated. In addition, since the E-PDCCH of the specific UE may be detected by the specific UE via blind decoding, the resources, to which the E-PDCCH is actually allocated, may be configured to indicate a union of resources, to which the E-PDCCHs of the UEs other than the specific UE (that is, the UEs forming the MU-MIMO pair with the specific UE) are allocated, among the UEs participating in MU-MIMO.

Here, the information about the region, to which the E-PDCCH is actually allocated, may be composed of i) a bitmap of a CCE level (or E-CCE level) or ii) a bitmap of an RB level.

In i) the bitmap of the CCE/E-CCE level, the bitmap size is {1 CCE/E-CCE*maximum aggregation level*maximum MU-MIMO order}. Here, the element "1 CCE/E-CCE" means the size (or number) of the CCE/E-CCE allocated to one UE. More specifically, the element "1 CCE/E-CCE" means a minimum size (or number) of the CCE/E-CCE allocated to one UE as a minimum allocation unit of the PDCCH/E-PDCCH. A maximum aggregation level may have a value of 8 if the E-PDCCH aggregation level is set to 1, 2, 4 or 8. The maximum MU-MIMO order means the number of UEs participating in MU-MIMO.

In ii) the bitmap of the RB level, the bitmap size is {1 CCE/E-CCE per PRB*maximum aggregation level*maximum MU-MIMO order}. Here, the element "1 CCE/E-CCE per PRB" means the size (or number) of CCE/E-CCE allocated to one UE per PRB pair. More specifically, the element "1 CCE/E-CCE per PRB pair" means a minimum size (or number) of CCE/E-CCE allocated to one UE per PRB pair as a minimum allocation unit of the PDCCH/E-PDCCH.

In i), if 1 CCE/E-CCE is less than 1 RB, an actual E-PDCCH allocation resource location may be advantageously expressed with higher resolution but the bitmap size is rapidly increased if 1 CCE/E-CCE is equal to or greater than 1 RB.

In ii), if 1 CCE/E-CCE is less than 1 RB, resource use efficiency may be decreased due to low resolution (that is, since resources, to which the E-PDCCH is not allocated within one RB pair, may not be expressed) if 1 CCE/E-CCE is equal to or greater than 1 RB, but the bitmap size is reduced.

Accordingly, i) the bitmap of the CCE/E-CCE level is preferable if 1 CCE/E-CCE is less than 1 RB and ii) the bitmap of the RB level is preferable if 1 CCE/E-CCE is equal to or greater than 1 RB.

Embodiment 3

Embodiment 3 relates to a method for increasing blind decoding efficiency when a plurality of E-PDCCHs is transmitted to one UE.

The UE may perform blind decoding within an E-PDCCH allocable region to detect an E-PDCCH thereof and confirm PDSCH allocation information via DCI of the detected E-PDCCH. Here, in order to detect an additional E-PDCCH (that is, an E-PDCCH including additional DCI other than the DCI of the already detected E-PDCCH) of the UE, the UE may continue to perform blind decoding with respect to the E-PDCCH allocable region.

In the actual E-PDCCH allocation information of Embodiment 2, the E-PDCCH of the specific UE is detected and then E-PDCCH(s) of other UE(s) are allocated. However, in the present embodiment, actual allocation information of the E-PDCCHs including the E-PDCCH(s) for the other UE(s) and the additional E-PDCCH of the specific UE may be configured. Here, the actual E-PDCCH allocation information may not indicate which E-PDCCH is allocated to a specific resource region (that is, E-PDCCH(s) of other UE(s) is allocated or the additional E-PDCCH of the specific UE is allocated) but indicate the location of specific resources in which the E-PDCCH of an arbitrary UE (the specific UE or other UE(s)).

Accordingly, the UE, which will detect the additional E-PDCCH after detecting the E-PDCCH, may preferentially (restrictively) perform blind decoding in a resource region in which the E-PDCCH is indicated to be present using the actual E-PDCCH allocation information, thereby reducing blind decoding complexity.

Figure 13:
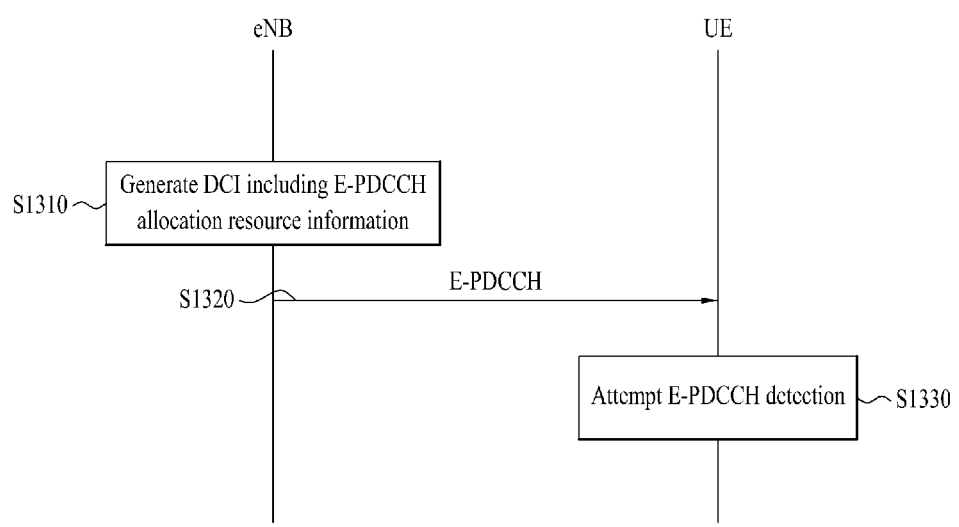
FIG. 13 is a flowchart illustrating a method for transmitting and receiving downlink control information via an E-PDCCH according to an embodiment of the present invention.

FIG. 13 is a flowchart illustrating a method for transmitting and receiving downlink control information via an E-PDCCH according to an embodiment of the present invention.

In step S1310, the base station may generate DCI including E-PDCCH allocation resource information (that is, information indicating the location of the resources to which the E-PDCCH(s) of arbitrary UE(s) is allocated). Here, the E-PDCCH allocation resource information should be distinguished from information indicating the above-described E-PDCCH allocable resource region. Although it is assumed that the E-PDCCH allocation resource information is included in DCI in the example of step S1310, the E-PDCCH allocation resource information may be provided to the UE via higher layer signaling as in the above-described embodiment. In addition, the E-PDCCH allocation resource information may be configured in the form of a bitmap.

In step S1320, the base station may provide the DCI to the UE via the E-PDCCH.

In step S1330, the UE may attempt detection of the E-PDCCH in the E-PDCCH allocable resource region. When the UE detects the E-PDCCH thereof and acquires the E-PDCCH allocation resource information included in the DCI transmitted via the E-PDCCH, the UE may confirm a valid PDSCH resource allocation region based on the E-PDCCH allocation resource information and accurately perform PDSCH decoding. In addition, the UE may more efficiently perform blind decoding with respect to an additional E-PDCCH thereof using the E-PDCCH allocation resource information.

Details of the above-described various embodiments of the present invention may be independently applied or 2 or more embodiments may be applied at the same time. In this case, overlapping details will be omitted from the description for simplicity and clarity.

Furthermore, in the description of the various embodiments of the present invention, although a downlink transmission subject is a base station and a downlink reception subject is a UE, the scope of the present invention is not limited thereto. That is, the principle of the present invention described using the various embodiments of the present invention may also be equally applied to the case in which a relay functions as a downlink transmission subject or an uplink reception subject with respect to a UE or the case in which a relay functions an uplink transmission subject or a downlink reception subject with respect to a base station.

Figure 14:
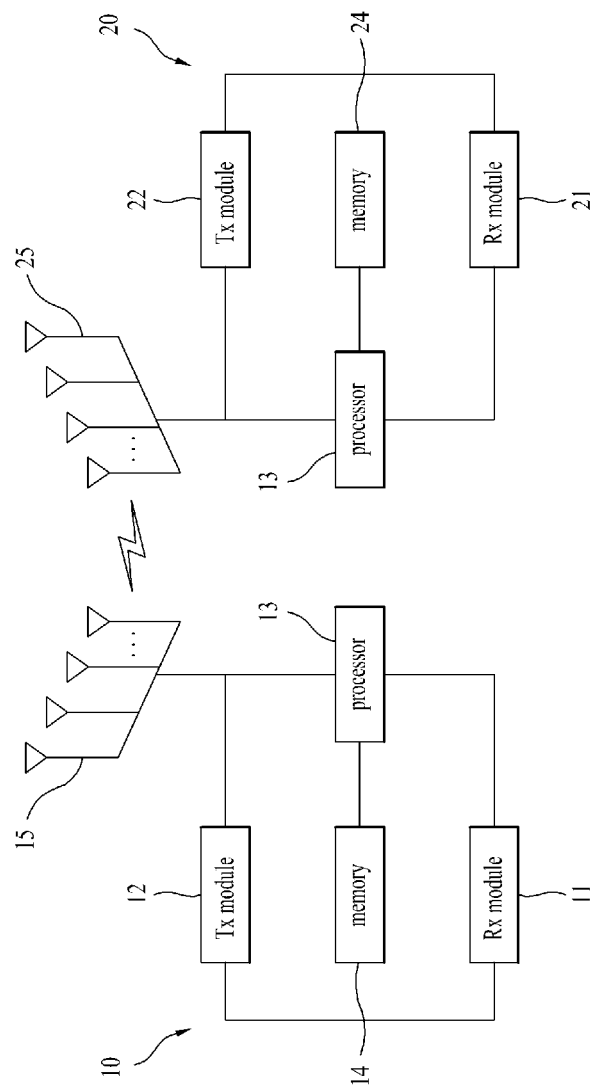
FIG. 14 is a diagram showing the configuration of an exemplary embodiment of a downlink transmission apparatus and a downlink reception apparatus according to the present invention.

FIG. 14 illustrates a downlink transmission apparatus and a downlink reception apparatus according to an embodiment of the present invention. Referring to FIG. 14, the downlink transmission apparatus 10 according to the present invention may include a reception module 11, a transmission module 12, a processor 13, a memory 14, and a plurality of antennas 15. The plurality of antennas 15 indicates that the downlink transmission apparatus supports MIMO transmission and reception. The reception module 11 may receive various signals, data, and information on an uplink from the downlink reception apparatus 20. The transmission module 12 may transmit various signals, data, and information on a downlink to the downlink reception apparatus 20. The processor 13 may control the overall operations of the downlink transmission apparatus 10.

The downlink transmission apparatus 10 according to the embodiment of the present invention may be configured to transmit a downlink control channel. The processor 13 may be configured to transmit one or more E-PDCCHs to one or more downlink reception apparatuses via the transmission module 12 in an E-PDCCH allocable resource region. The processor 13 may be configured to transmit E-PDCCH allocation resource information of the one or more E-PDCCIs to the one or more downlink reception apparatus using the transmission module. Here, the E-PDCCH allocation resource information may indicate resources, to which the one or more E-PDCCHs are allocated, of the E-PDCCH allocable resource region. In addition, the downlink reception apparatus may accurately determine a. valid PDSCH allocation resource region thereof based on the E-PDCCH allocation resource information.

The processor 13 of the downlink transmission apparatus 10 performs a calculation/operation process on information received by the downlink transmission apparatus 10, information to be transmitted an external device, and so on. The memory 14 may store the operated information for a predetermined period of time, and the memory 14 may be replaced by another element, such as a buffer (not shown).

Referring to FIG. 14, the downlink reception apparatus 20 according to the present invention may include a reception module 21, a transmission module 22, a processor 23, a memory 24, and a plurality of antennas 25. The plurality of antennas 25 indicates that the downlink reception apparatus supports MIMO transmission and reception. The reception module 21 may receive various signals, data, and information on a downlink from downlink transmission apparatus 10. The transmission module 22 may transmit various signals, data, and information on an uplink to the downlink transmission apparatus 10. The processor 23 may control the overall operations of the downlink reception apparatus 20.

The downlink reception apparatus 20 according to the embodiment of the present invention may be configured to receive a downlink control channel. The processor 23 may be configured to detect one or more E-PDCCHs in an E-PDCCH allocable resource region via the reception module 21. The processor 23 may be configured to receive E-PDCCH allocation resource information configured by the downlink transmission apparatus using the reception module 21. Here, the E-PDCCH allocation resource information may indicate resources, to which one or more E-PDCCHs of the downlink reception apparatus or a plurality of E-PDCCHs of several downlink reception apparatuses are allocated, of the E-PDCCH allocable resource region. In addition, the downlink reception apparatus 20 may accurately determine a valid PDSCH allocation resource region thereof based on the E-PDCCH allocation resource information.

Moreover, the processor 23 of the downlink reception apparatus 20 performs a calculation/operation process on information received by the downlink reception apparatus 20, information to be transmitted to an external device, and so on. The memory 24 may store the operated information for a predetermined period of time, and the memory 24 may be replaced by another element, such as a buffer (not shown).

In the above-described detailed configuration of the downlink transmission apparatus 10 and the downlink reception apparatus 20, details of the above-described various embodiments of the present invention may be independently applied or 2 or more embodiments may be applied at the same time. In this case, overlapping details will be omitted from the description for simplicity and clarity.

Furthermore, the description of the downlink transmission apparatus of FIG. 14 may also be applied to a base station or a relay device functioning as a downlink transmission subject or an uplink reception subject. The description of the downlink reception apparatus 20 of FIG. 14 may also be applied to a UE or a relay device functioning as an uplink transmission subject or a downlink reception subject.

The above-described embodiments of the present invention can be implemented by a variety of means, fur example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a. memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method for transmitting a downlink control channel by a base station to a user equipment (UE) in a wireless communication system, the method comprising:
   transmitting, by the base station, enhanced physical downlink control channel (E-PDCCH) allocation resource information, through a RRC (Radio Resource Control) message, indicating E-PDCCH resource regions in which one or more E-PDCCHs can be transmitted to the UE;
   transmitting, by the base station, the one or more E-PDCCHs to the UE, wherein each of the one or more E-PDCCHs includes downlink control information (DCI) on a first E-PDCCH resource region,
   wherein a valid physical downlink shared channel (PDSCH) allocation resource region for the UE is a resource region that excludes the first E-PDCCH resource region, and
   wherein the first E-PDCCH resource region is identified by blind decoding by the UE, and
   wherein the DCI of each of the one or more E-PDCCHs includes information on a second E-PDCCH resource region other than the first E-PDCCH resource region.

2. The method according to claim 1, wherein transmitting the one or more E-PDCCHs includes transmitting a plurality of E-PDCCHs for a plurality of UEs participating in multiple user-multiple input multiple output (MU-MIMO).

3. The method according to claim 1, wherein transmitting the one or more E-PDCCHs includes transmitting a plurality of E-PDCCHs of one UE.

4. The method according to claim 1, wherein, after the E-PDCCH allocation resource information is transmitted to the UE, an additional E-PDCCH for the UE is detected in a resource region in which the one or more E-PDCCHs are determined to be present based on the E-PDCCH allocation resource information.

5. The method according to claim 1, wherein the E-PDCCH allocation resource information is configured as a bitmap.

6. The method according to claim 5, wherein the bitmap is configured at an enhanced-control channel element (E-CCE) level.

7. The method according to claim 5, wherein the bitmap is configured at a resource block level.

8. The method according to claim 1, wherein, if downlink system bandwidth includes a plurality of partitions, the E-PDCCH resource regions are are configured as a set of partial resource regions of each of the plurality of partitions.

9. The method according to claim 8, wherein:
the plurality of partitions is a plurality of subbands, and one subband includes a plurality of resource blocks.

10. The method according to claim 1, wherein the DCI of each of the one or more E-PDCCHs includes information on whether the second part of the E-PDCCH resource is used for another UE.

11. A method for receiving a downlink control channel by a user equipment (UE) from a base station in a wireless communication system, the method comprising:
receiving, at the UE, enhanced-physical downlink control channel (E-PDCCH) allocation resource information, through a RRC (Radio Resource Control) message, indicating E-PDCCH resource regions in which one or more E-PDCCHs can be received, from the base station,
detecting the one or more E-PDCCHs on a first E-PDCCH resource region based on a blind decoding by the UE, wherein each of the one or more E-PDCCHs includes downlink control information (DCI); and
wherein a valid physical downlink shared channel (PDSCH) allocation resource region for the UE is a resource region that excludes the first E-PDCCH resource region
wherein the DCI of each of the one or more E-PDCCHs includes information on a second E-PDCCH resource region other than the first E-PDCCH resource region.

12. The method according to claim 11, wherein the DCI of each of the one or more E-PDCCHs includes information on whether the second part of the E-PDCCH resource is used for another UE.

13. A base station apparatus for transmitting a downlink control channel to a user equipment (UE) in a wireless communication system, the base station apparatus comprising:
a reception module;
a transmission module; and
a processor that:
controls the transmission module to transmit enhanced physical downlink control channel (E-PDCCH) allocation resource information, through a RRC (Radio Resource Control) message, indicating E-PDCCH resource regions in which one or more E-PDCCHs can be transmitted to the UE,
and controls the transmission module to transmit the one or more E-PDCCHs to the UE,
wherein each of the one or more E-PDCCHs includes downlink control information (DCI) on a first E-PDCCH resource region,
wherein a valid physical downlink shared channel (PDSCH) allocation resource region for the UE is a resource region that excludes the first E-PDCCH resource region, and
wherein the first E-PDCCH resource region is identified by blind decoding by the UE, and
wherein the DCI of each of the one or more E-PDCCHs includes information on a second E-PDCCH resource region other than the first E-PDCCH resource region.

14. The base station apparatus according to claim 13, wherein the DCI of each of the one or more E-PDCCHs includes information on whether the second part of the E-PDCCH resource is used for another UE.

15. A user equipment (UE) apparatus for receiving a downlink control channel from a base station in a wireless communication system, the UE apparatus comprising:
a reception module;
a transmission module; and
a processor that:
controls the reception module to receive enhanced-physical downlink control channel (E-PDCCH) allocation resource information, through a RRC (Radio Resource Control) message, indicating E-PDCCH resource regions in which one or more E-PDCCHs can be received, from the base station,
and to detect the one or more E-PDCCHs on a first E-PDCCH resource region based on a blind decoding, wherein each of the one or more E-PDCCHs includes downlink control information (DCI),
wherein a valid physical downlink shared channel (PDSCH) allocation resource region for the UE is a resource region that excludes the first E-PDCCH resource region, and
wherein the DCI of each of the one or more E-PDCCHs includes information on a second E-PDCCH resource region other than the first E-PDCCH resource region.

16. The UE apparatus according to claim 15, wherein the DCI of each of the one or more E-PDCCHs includes information on whether the second part of the E-PDCCH resource is used for another UE.

* * * * *